Sept. 15, 1953    B. MECHUR ET AL    2,651,809
SHOULDER PAD MOLDING APPARATUS
Filed Sept. 21, 1948    4 Sheets-Sheet 1
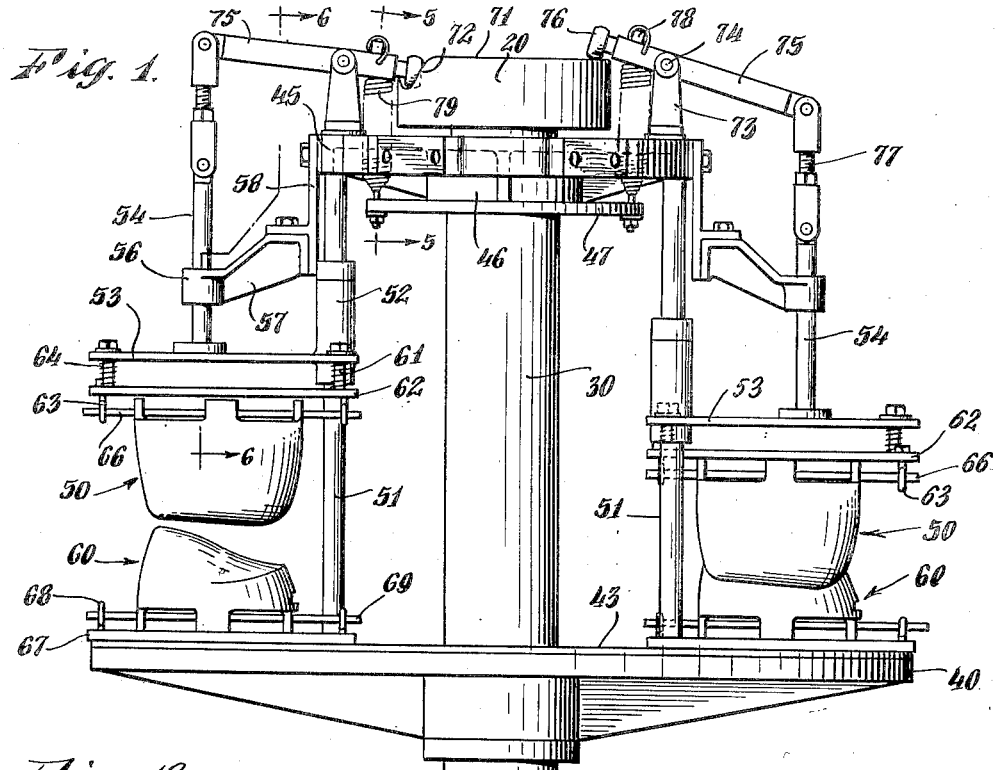

Sept. 15, 1953 B. MECHUR ET AL 2,651,809
SHOULDER PAD MOLDING APPARATUS
Filed Sept. 21, 1948 4 Sheets-Sheet 2
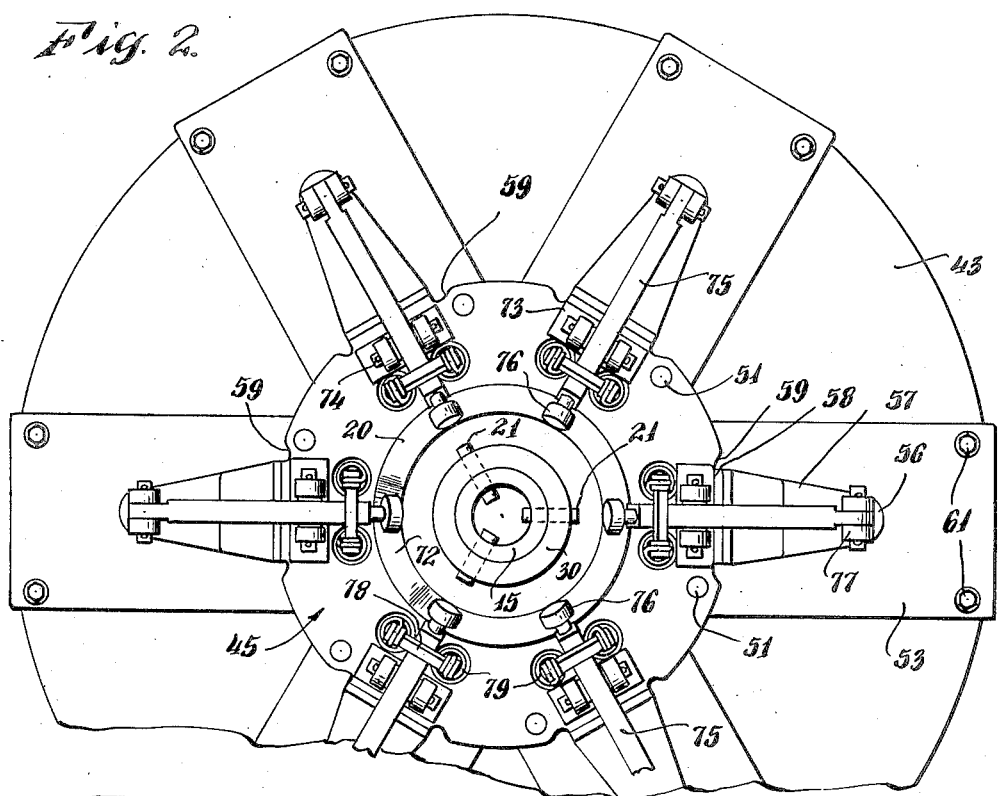
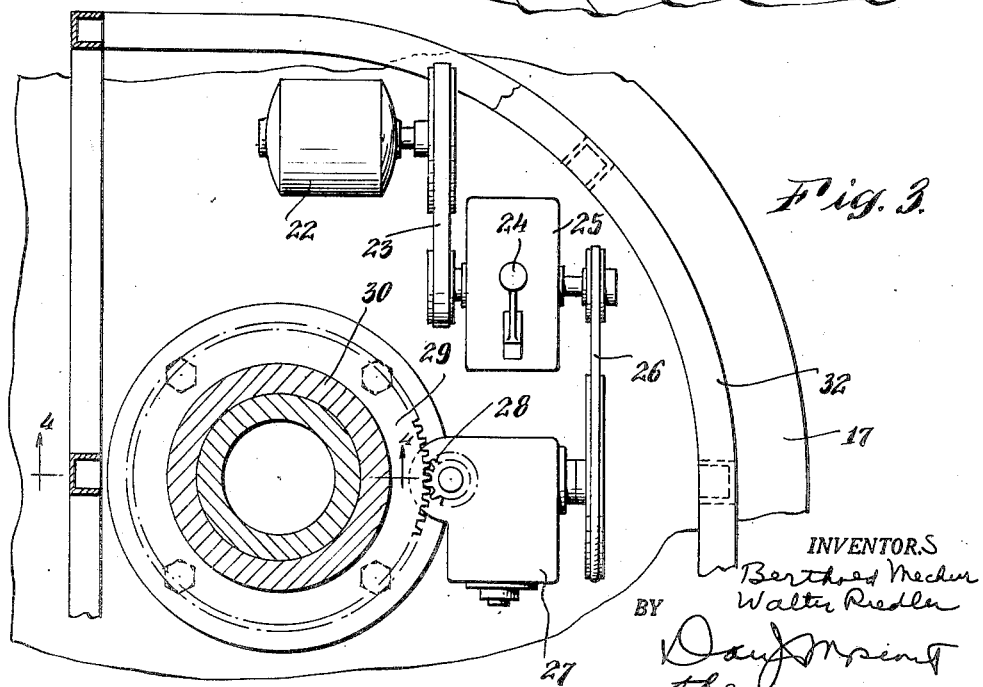
INVENTORS
Berthold Mechur
Walter Riedler
BY
their ATTORNEY

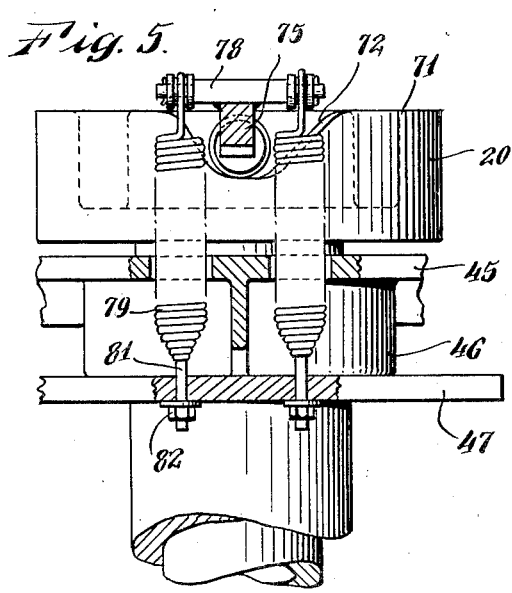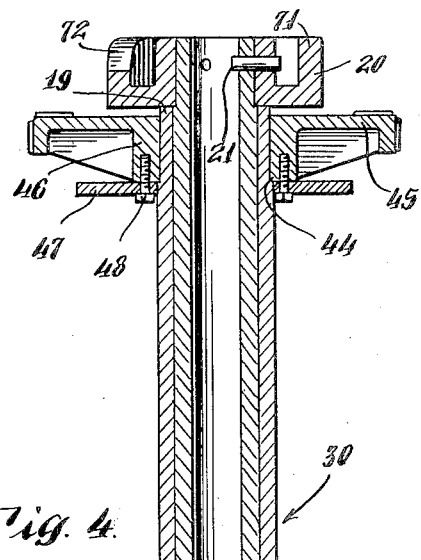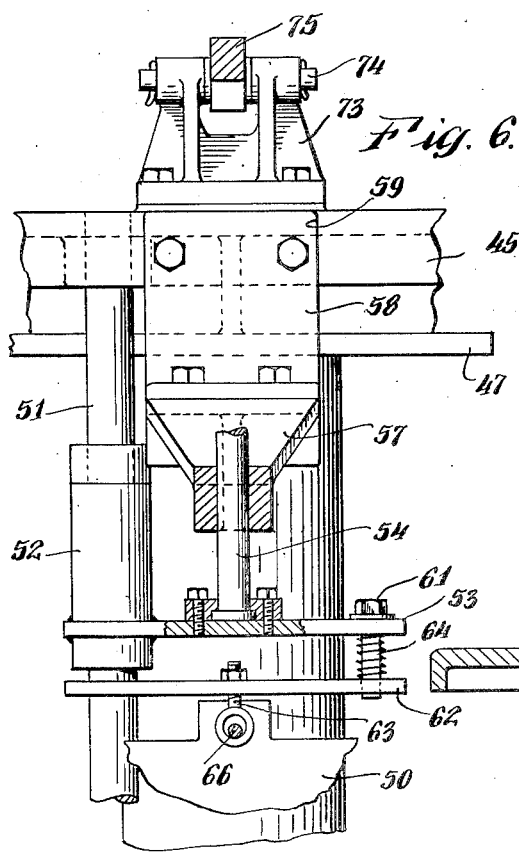

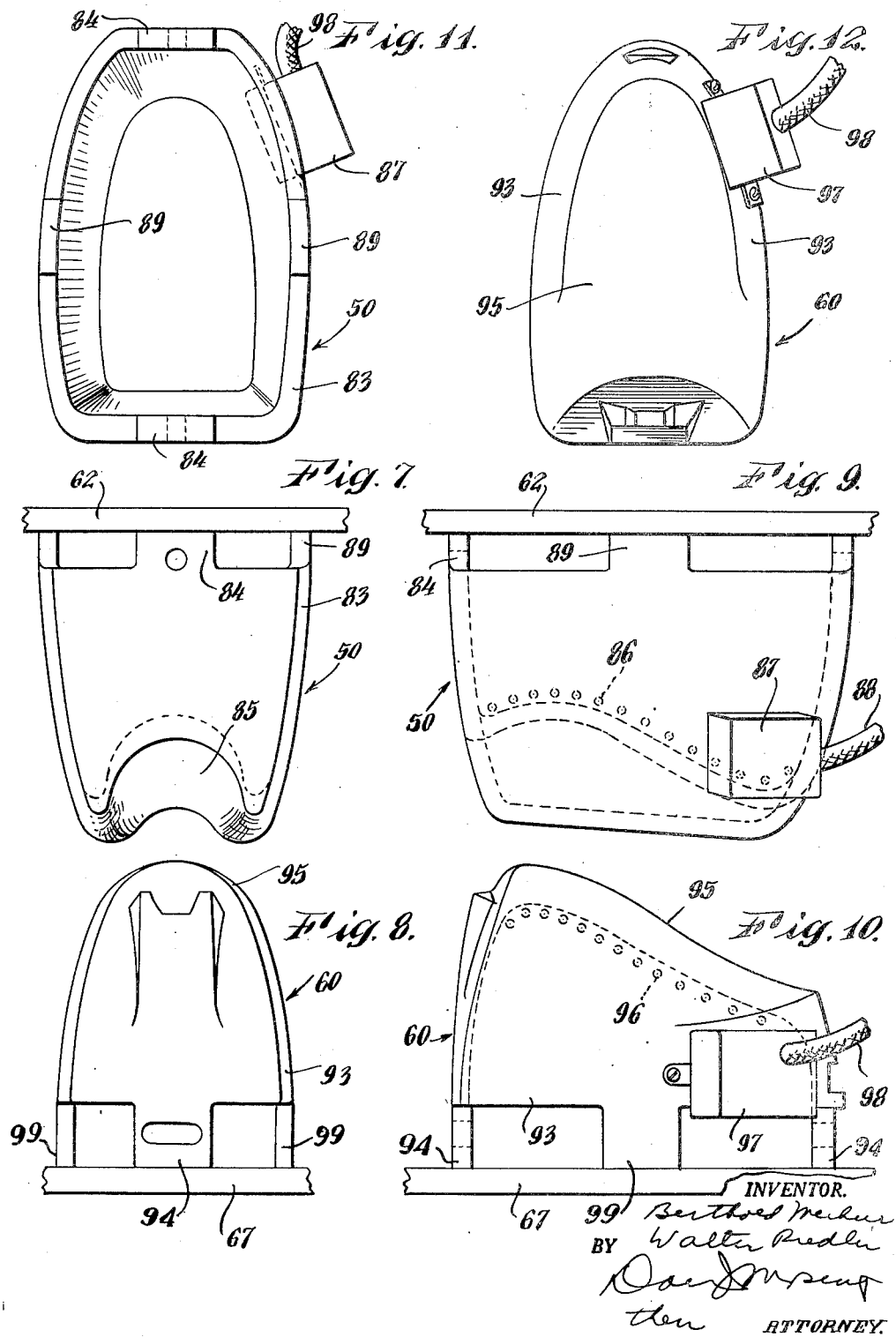

Patented Sept. 15, 1953

2,651,809

UNITED STATES PATENT OFFICE 2,651,809

SHOULDER PAD MOLDING APPARATUS

Berthold Mechur and Walter Riedler,
New York, N. Y.

Application September 21, 1948, Serial No. 50,324

2 Claims. (Cl. 18—20)

This invention relates to molding apparatus and, more particularly, to such apparatus for forming complexly curved shapes by the prolonged application of heat and pressure. Specifically, the invention is directed to apparatus for forming garment pads, such as shoulder pads, for example.

The formation of shoulder pads presents many problems. For example, such pads must be stable enough to retain their overall shape, flexible so as to accommodate themselves to movements of the wearer, and resilient so as to assume their initial position. Furthermore, they should be resistant to changes in shape or smoothness during washing, cleaning and pressing of the garment.

Additionally, shoulder pads have a curvature fore and aft of the shoulder as well as a taper or curvature along the shoulder. These are necessary to give a natural appearance to the garment in which the pad is incorporated.

To meet all these requirements, resort has been had to numerous expedients. For example, some pads include cotton or wool wadding components for surface stability and flexibility, and rubber or rubberized material components for flexibility. These pads are built up of a plurality of such components so shaped and arranged as to impart the desired form to the pad.

Another type of pad has been molded from sponge rubber, rubberized fiber, or the like. The material is placed in a press, shaped to impart the desired form to the pad, and then held under heat and pressure for a sufficient time to set the pad.

In the present invention, apparatus is provided for forming a pad having sponge rubber or rubberized fiber inner and outer members between which are placed one or more layers of the same material or of cotton or wool wadding. The inner and outer layer preferably extend beyond the filler layers.

The invention apparatus includes relatively movable, heated plates. The components of the pad, suitably tacked together by staples or the like, are placed on one plate and pressure is applied by moving the plates toward each other. The heated plates have opposed faces complexly shaped to impart the desired form to the pad. The pad elements are held between the heated plates for a sufficient length of time to deform, set and bond the rubber or rubberized material layers in the desired form for the pad.

Preferably, a series of heated pressure plates are carried on a rotating structure. Cam means are provided to open the plates at one station so that a formed pad may be removed and an unformed pad put between the plates. The cam means then close the plates on the pad and maintain it under heat and pressure until the particular set of plates again reach the loading and unloading station.

It is accordingly among the objects of this invention to provide a continuously operating heat and pressure applying apparatus for forming and shaping garment pads.

Another object is to provide such an apparatus having a series of heating and pressing plates rotatable past a loading station and automatically opened at such station for removal of a formed pad and insertion of an unformed pad, the plates being closed during the major portion of the time.

A further object is to provide such an apparatus having articulated supporting means for the plates to insure conforming engagement with the pads.

These and other objects, advantages and novel features of the invention will be apparent from the following description and the accompanying drawings.

In the drawings:

Fig. 1 is an elevation view of apparatus embodying the invention.

Fig. 2 is a partial plan view of the apparatus.

Fig. 3 is a view, partly in section, on the line 3—3 of Fig. 1.

Fig. 4 is a vertical sectional view on the line 4—4 of Fig. 3.

Figs. 5 and 6 are vertical sectional views on the lines 5—5 and 6—6, respectively, of Fig. 1.

Figs. 7 and 8 are end elevation views of the upper and lower heating and pressure plates, respectively.

Figs. 9 and 10 are side elevation views of the upper and lower heating and pressure plates, respectively.

Figs. 11 and 12 are top plan views of the upper and lower plates, respectively.

Fig. 13 is a plan view, and Fig. 14 is an end elevation view, of the completed shoulder pad.

Referring to the drawings, the apparatus includes a main cylindrical column 15 having its lower end secured in a support 16 mounted on a base 17. Set screw 18 restrains rotation of column 15 relative to support 16 and base 17. The upper end of column 15 is reduced to form a shoulder 19 upon which rests a circular cam 20. Cam 20 is held against rotation by one or more pins 21.

Base 17 supports a driving motor 22 connected by a belt 23 to a clutch 25 having an operating handle 24. A belt 26 connects clutch 25 to gearing 27 having an output pinion 28 engaging a ring gear 29 secured by a set screw 31 to an elongated sleeve 30 telescoped over column 15. A railing 32 may be mounted on base 17 to enclose the driving means.

The lower end of sleeve 30 rests on support 16 and has a collar 33 secured thereto by a set screw 34. Above gear 29, sleeve 30 carries a circular bearing collar 35 rotatably engaged in a circular, flanged recess 36 in a horizontal plate 37 carried by railing 32. This construction affords an intermediate brace for column 15 and sleeve 30.

Above bearing collar 35, sleeve 30 carries a circular platform 40 having a cylindrical bearing 38 secured to rotate with sleeve 30 by a set screw 39. A clamping collar 41, secured to sleeve 30 by a set screw 42, engages the lower end of bearing 38, and a circular plate 43 is carried by the upper surface of platform 40. The upper end of sleeve 30 is reduced to form a shoulder 44, and a second, smaller circular platform 45 has a bearing 46 resting on this platform. A circular flange 47 is secured to bearing 46 by studs 48.

A plurality of guide columns 51, shown as six in number, interconnect platforms 40 and 45. Each column 51 slidably carries a sleeve 52 secured to a plate 53. Adjacent its center, each plate 53 carries a vertical rod 54 slidably engaged in a bearing 56 on the outer end of a horizontal bracket 57 secured to a vertical bracket 58 in turn secured in a peripheral recess 59 of platform 45.

Plates 53 carry the upper heating and pressing plates 50, which are reciprocable relative to the lower heating and pressing plates 60. For this purpose headed studs 61 extend through apertures in each plate 53 and are secured at their lower ends to a second plate 62 carrying a pair of spaced eye bolts 63, 63. A spring 64 surrounds each stud, and urges plates 53 and 62 apart. Eyebolts 63 support a rod 66 from which each pressure plate 50 is suspended in a manner described hereinafter.

Plates 60 are supported in a similar manner. Platform 40 carries plates 67 having upstanding eyebolts 68 supporting a rod 69. Lower pressure plates 60 are supported on rods 69. Plates 50 and 60 thus have a slight rocking movement on their respective rods, providing for adjustment of the plates into a conforming fit. Some play is provided also by the springs 64 surrounding studs 61.

Plates 50 are moved relative to plates 60 by mechanism cooperable with cam 20. This cam has the major portion of its upper surface lying in a horizontal plane, as indicated at 71. At one point, however, the upper surface of cam 20 has a considerable dip, providing a dwell 72.

Forked brackets 73 are mounted on platform 45 adjacent each recess 59, and each bracket 73 carries a cross pin 74 supporting a radial rocker arm 75. On its inner end, each arm 75 rotatably carries a roller 76 engaging the upper surface of cam 20. The outer end of each arm 75 is pivotally connected to the upper end of a turnbuckle 77, and the lower end of each turnbuckle is pivotally connected to the upper end of a rod 54.

Inwardly of bracket 73, each arm 75 has a cross bar 78 secured thereto, as by welding. A pair of heavy, coil tension springs 79, 79 are associated with each rod 75. These springs have their upper ends hooked over the ends of cross bars 78, and extend through apertures in platform 45. The lower ends of the springs carry studs 81 extending through apertures in flange 47 and having nuts 82 for adjustment of the spring tension.

The upper and lower pressure plates 50, 60 are shown in Figs. 7 through 12. Referring to Figs. 7, 9 and 11, upper plate or mold 50 has a complexly curved concave lower surface 85 with heating elements 86 disposed therealong. Current is applied to the heating elements 86 through a junction box 87 having a conductor 88 connected to a suitable source of current. A vertical flange 83 extends upwardly from surface 85, and carries projecting apertured ears 84, 89. Ears 84 receive rods 66, whereas ears 89 act as limits to the rocking of plate 50 on rod 66, through engagement with supporting plates 62.

Plate or mold 60 has a complexly curved, generally convex upper surface 95 with heating elements 96 disposed along its inner surface. Elements 96 receive current from a junction box 97 having a conductor 98 connected to a suitable source of electric current. A vertical flange 93 extends downwardly from surface or wall 95 and has projecting ears 94 and 99. Ears 94 are apertured to receive rod 69 on plate 67, and ears 99 engage plate 67 to limit rocking of plate 60 on rod 69.

The described apparatus operates in the folowing manner. With motor 22 energized and clutch 25 engaged by actuation of lever 24, sleeve 30 and its connected elements are rotated on column 15 through pin on 28 driving gear 29. The rollers 76 thus roll around the upper surface of cam 20, normally being held in an elevated position to press plates 50 toward plates 60.

When a set of plates 50, 60 reaches the loading station, its associated roller 76 rides into dwell 72 of cam 20, being pulled downwardly by springs 79. This separates the plate 50 from the plate 60. The temporarily tacked together shoulder pad elements are then placed on the lower plate 60 and, as sleeve 30 rotates, roller 76 rides up out of dwell 72 to press plate 50 against the upper surface of the pad. The pad elements are held under heat and pressure until the plates 50, 60 again reach the loading station and are separated. The completed pad is then removed and a new assembly placed on the lower plate 60.

The heat and pressure forms the pad 100 to the shape shown in Figs. 13 and 14, causing the rubber, rubberized fabric, or plastic portions to deform and adhere to each other. The operation is continuous, with a completed pad being removed and a new pad assembly inserted each time a set of plates reaches the loading station at dwell 72 of cam 20.

While a specific embodiment of the invention has been shown and described in detail to illustrate the application of the principles thereof, it will be understood that the invention may be embodied otherwise without departing from such principles.

What is claimed is:

1. Molding apparatus comprising, in combination, a base; a column extending substantially centrally from said base; a sleeve embracing said column and rotatable thereon; said column extending beyond said sleeve at each end; means for rotating said sleeve; a first support fixed to said sleeve intermediate its ends and rotatable therewith; a plurality of pressure molds carried by said first support; a second support fixed to the upper end of said sleeve and rotatable therewith; vertical guides interconnecting said supports at each mold; said supports carrying said molds in a circular path; said mold each comprising a member fixed relatively to said first support and a member movable vertically relative to said fixed member along the adjacent guide; a cam fixed on said column; and cam followers mounted on said second support, each operatively connected to a movable mold member and engaging said cam and effective to open said molds at one point in said path for unloading and reloading and to maintain said molds closed throughout the remainder of said path; said fixed mold member being rockably mounted on a radial rod secured to said first support and including means limiting such rocking movement and said movable mold member being rockably mounted on a radial rod secured to a plate slidable on a guide and including means limiting such rocking movement, whereby said mold members have a limited relative displacement to accommodate their interfacing surfaces.

2. Shoulder pad molding apparatus comprising, in combination, a base; a column extending substantially centrally from said base; a sleeve embracing said column and rotatable thereon; said column extending beyond said sleeve at each end; means for rotating said sleeve; a first support fixed to said sleeve intermediate its ends and rotatable therewith; a plurality of pressure molds carried by said first support; a second support fixed to the upper end of said sleeve and rotatable therewith; vertical guides interconnecting said supports at each mold; said supports carrying said molds in a circular path; said mold each comprising a member fixed relatively to said first support and a member movable vertically relative to said fixed member along the adjacent guide; a cam fixed on said column; cam followers mounted on said second support, each operatively connected to a movable mold member and engaging said cam and effective to open said molds at one point in said path for unloading and reloading and to maintain said molds closed throughout the remainder of said path; said fixed mold member being rockably mounted on a radial rod secured to said first support and including means limiting such rocking movement and said movable mold member being rockably mounted on a radial rod secured to a plate slidable on a guide and including means limiting such rocking movement, whereby said mold members have a limited relative displacement to accommodate their interfacing surfaces; the lower mold member having a convex-upper surface and the upper mold member having a concave lower surface whereby to impart a concave-convex shape to a shoulder pad assembly inserted in the mold; and means to heat said mold members to set said assembly during travel of the mold around the mold closing portion of said path.

BERTHOLD MECHUR.
WALTER RIEDLER.

References Cited in the file of this patent

UNITED STATES PATENTS

| Number | Name | Date |
|---|---|---|
| 610,524 | Cleveland | Sept. 13, 1898 |
| 1,492,510 | Escobales | Apr. 29, 1924 |
| 1,525,629 | Thompson | Feb. 10, 1925 |
| 1,711,978 | Wanders | May 7, 1929 |
| 2,053,402 | Le Mare | Sept. 8, 1936 |
| 2,058,880 | Hunt | Oct. 27, 1936 |
| 2,293,070 | Miller et al. | Aug. 18, 1942 |
| 2,342,378 | Smith | Feb. 22, 1944 |
| 2,354,029 | Kingston | July 18, 1944 |
| 2,445,742 | Hoch | July 20, 1948 |